(12) United States Patent
Morrison

(10) Patent No.: US 10,581,800 B2
(45) Date of Patent: Mar. 3, 2020

(54) PROTECTING COMPUTER SERVERS FROM API ATTACKS USING COORDINATED VARYING OF URL ADDRESSES IN API REQUESTS

(71) Applicant: CA, Inc., New York, NY (US)

(72) Inventor: Kenneth William Scott Morrison, New Westminster (CA)

(73) Assignee: CA, Inc., New York, NY (US)

( * ) Notice: Subject to any disclaimer, the term of this patent is extended or adjusted under 35 U.S.C. 154(b) by 395 days.

(21) Appl. No.: 15/659,174

(22) Filed: Jul. 25, 2017

(65) Prior Publication Data
US 2019/0036878 A1  Jan. 31, 2019

(51) Int. Cl.
| | |
|---|---|
| H04L 29/06 | (2006.01) |
| H04L 29/08 | (2006.01) |
| G06F 21/44 | (2013.01) |
| G06F 21/54 | (2013.01) |
| G06F 16/00 | (2019.01) |
| G06F 16/955 | (2019.01) |

(52) U.S. Cl.
CPC .......... *H04L 63/0209* (2013.01); *G06F 16/00* (2019.01); *G06F 16/9566* (2019.01); *G06F 21/44* (2013.01); *G06F 21/54* (2013.01); *H04L 63/068* (2013.01); *H04L 63/1441* (2013.01); *H04L 67/02* (2013.01)

(58) Field of Classification Search
CPC ............ H04L 63/0281; H04L 63/1416; H04L 63/0209; H04L 63/068; H04L 63/1441; G06F 16/9566; G06F 16/00; G06F 21/44; G06F 21/54

See application file for complete search history.

(56) References Cited

U.S. PATENT DOCUMENTS

| | | | | |
|---|---|---|---|---|
| 7,454,622 B2 * | 11/2008 | Laidlaw | .................. | H04L 63/08 709/225 |
| 8,307,003 B1 * | 11/2012 | Sheth | ..................... | G06F 16/958 707/790 |
| 9,667,704 B1 * | 5/2017 | Sonawane | ............... | H04L 67/10 |
| 10,120,734 B1 * | 11/2018 | Doraiswamy | ........... | G06F 21/44 |
| 10,148,493 B1 * | 12/2018 | Ennis, Jr. | ............ | H04L 41/0803 |
| 10,152,605 B2 * | 12/2018 | Shetye | ................ | G06F 21/6218 |
| 2009/0235349 A1 * | 9/2009 | Lai | ........................ | H04L 9/3213 726/14 |
| 2014/0181517 A1 * | 6/2014 | Alaranta | ............... | H04L 63/062 713/168 |

* cited by examiner

*Primary Examiner* — Shanto Abedin

(57) ABSTRACT

An application programming interface (API) security gateway communicates with a client computer application to establish a URL key rotation operation. An API request is received from the client computer application that is directed to a computer server. The API request contains a URL address. The URL address is parsed to identify a URL key. A local validation key is generated based on the URL key rotation operation. The URL key is validated based on the local validation key to determine whether the URL key is valid. Based on determining that the URL key is valid, a modified API request is generated which contains the URL address with at least part of the URL key removed. The modified API request is provided to the computer server.

20 Claims, 5 Drawing Sheets

PROTECTING COMPUTER SERVERS FROM API ATTACKS USING COORDINATED VARYING OF URL ADDRESSES IN API REQUESTS

TECHNICAL FIELD

The present disclosure relates generally to computer security and, more particularly, to computer security that protects networked computer servers from API requests generated by hackers and other maliciously operating client computer applications.

BACKGROUND

Application programming interfaces (APIs) are a set of subroutine definitions, protocols, and tools for building application software that accesses resources available through the Internet. APIs build of the basic architecture of the World Wide Web, and are based on application of the HTTP protocol. However, certain characteristics of HTTP make APIs vulnerable to attacks from hackers.

APIs use the stateless HTTP protocol, which is a foundational element of the architecture of the World Wide Web. APIs are most often designed to be stateless, both to align with the characteristics of the HTTP protocol, and to simplify the development of high volume systems that scale by instantiating many parallel instances of a service.

This property of statelessness makes APIs particularly vulnerable to exploitation by hackers. Hackers look for weak points in the security of systems. APIs create a point of interaction with applications that may be vulnerable to hackers. Since APIs are commonly stateless, a hacker has many chances to mount attacks without detection, because each API call received by an application stands alone outside of the context of a logical flow of transactions.

A hacker can experiment with repetitive varying hacking attempts to an API endpoint to discover vulnerabilities. For example, a hacker might mount fuzzing attacks against an API endpoint, which involve sending repeated transactions containing random variations in parameters of an API request. The attack seeks to determine if a specific combination of parameters will reveal an existing system vulnerability, such as a buffer overflow vulnerability or a failure to properly authorize unexpected requests for service. SQL Injection is another example of an attack that is generally fine-tuned through repeated experimentation. Unlike fuzzing attacks, SQL Injection is executed in a more guided and active manner; however, it still exploits the statelessness of HTTP and the static nature of the API endpoint.

The basic architecture of the web is built around resources that are exposed as URL-addressable endpoints. The URL contains a protocol, internet address, an optional port, and an optional string to distinguish between different APIs on a particular computer server. Every unique API has an associated unique web URL. Different APIs, such as getStockQuote( ) and buyStock( ), will by distinguished by their different URLs. For example, the former might be accessible at the URL "http://acme.com/apis/getStockQuote", and the later at "http://acme.com/apis/buyStock".

An attack against the buyStock API might involve sending a large number of requests to probe the "http://acme.com/apis/buyStock" endpoint. Because the computer server is stateless, this may appear to be legitimate traffic even if it is not successfully executing a financial transaction, especially if the attack is mounted over a relatively long period of time so that it is concealed by intervening legitimate traffic. Accordingly, APIs provided by a computer server are vulnerable to many types of attacks that are carried out through API requests from hacker and other maliciously operating client computer applications.

SUMMARY

Some embodiments disclosed herein are directed to methods by an application programming interface (API) security gateway. The API security gateway communicates with a client computer application to establish a URL key rotation operation. An API request is received from the client computer application that is directed to a computer server. The API request contains a URL address. The URL address is parsed to identify a URL key. A local validation key is generated based on the URL key rotation operation. The URL key is validated based on the local validation key to determine whether the URL key is valid. Based on determining that the URL key is valid, a modified API request is generated which contains the URL address with at least part of the URL key removed. The modified API request is provided to the computer server.

Some other related embodiments disclosed herein are directed to methods by a client computer. The client computer communicates with an API security gateway to establish a URL key rotation operation. A URL key is generated based on the URL key rotation operation. A URL address is generated based on a combination of the URL key and a starting URL address. An API request is generated containing the URL address, and is communicated toward the API security gateway.

Some other related embodiments disclosed herein are directed to an API security gateway that includes network interface circuitry, processor circuitry, and memory circuitry. The processor circuitry is coupled to the network interface circuitry. The memory circuitry is coupled to the processor circuitry and includes computer readable program code that when executed by the processor circuitry causes the processor circuitry to perform operations. The operations includes communicating through the network interface circuitry with a client computer application to establish a URL key rotation operation, and receiving through the network interface circuitry an API request from the client computer application that is directed to a computer server. The API request containing a URL address. The operations further include parsing the URL address to identify a URL key, generating a local validation key based on the URL key rotation operation, and validating the URL key based on the local validation key to determine whether the URL key is valid. Based on determining that the URL key is valid, the operations generate a modified API request containing the URL address with at least part of the URL key removed, and provide the modified API request through the network interface circuitry to the computer server.

It is noted that aspects described with respect to one embodiment disclosed herein may be incorporated in different embodiments although not specifically described relative thereto. That is, all embodiments and/or features of any embodiments can be combined in any way and/or combination. Moreover, methods, systems, and/or computer program products according to embodiments will be or become apparent to one with skill in the art upon review of the following drawings and detailed description. It is intended that all such additional methods, systems, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Figure 1:
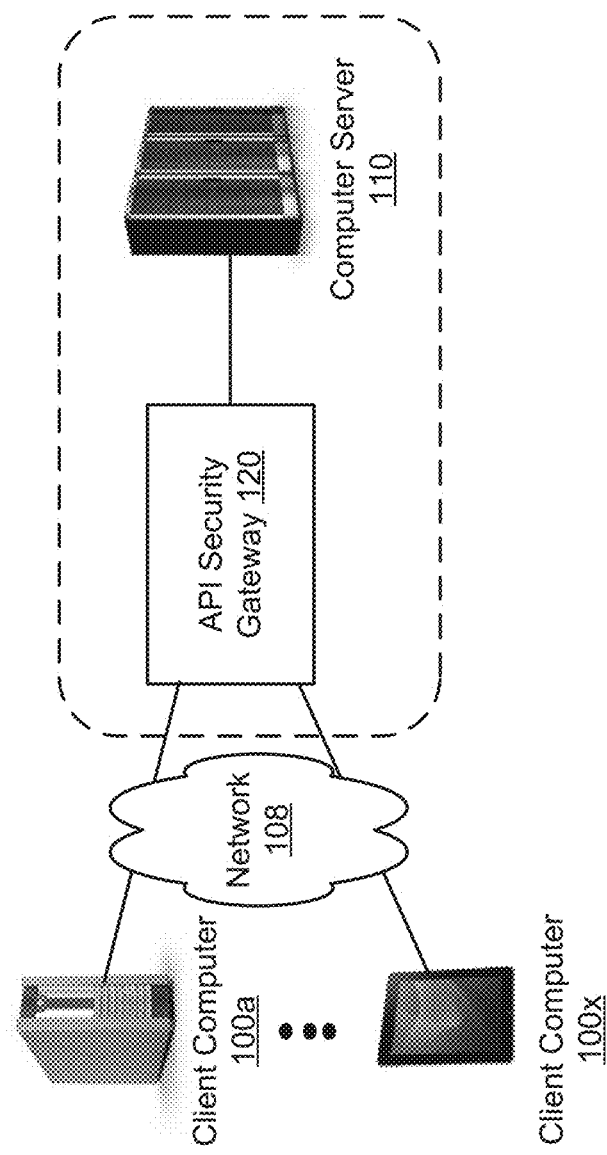
FIG. 1 is a block diagram of a computer system that includes an API security gateway that protects a computer server from API requests from a client computer, in accordance with some embodiments.

FIG. 1 is a block diagram of a computer system that includes an API security gateway 120 that protects a computer server 110 from API requests received from client computers 100a through 100x (individually referred to as client computer 100), in accordance with some embodiments. The API security gateway 120 is connected to receive API requests (e.g., Web service API calls, RESTful API requests, etc.) through one or more data networks 108 (e.g., local area network and/or wide area network) from applications processed by one or more client computers 100a-100x. The API security gateway 120 operates to validate received API requests based on URL addresses contained therein, and to forward valid API request to the computer server 110 for processing to allow access to various resources (e.g., application programs and/or data) provided by the computer server 110.

Although the API security gateway 120 is shown as being separate from the computer server 110, in some embodiments the API security gateway 120 is embedded at least partially within or entirely within the computer server 110. Accordingly, the API security gateway 120 may communicate through the data network 108 with the computer server 110 or may communicate through a shared backplane bus or local network.

Various embodiments disclosed herein are directed to reducing security risks to a computer server 110 when processing API requests that are received through APIs provided to applications being processed by client computers, such as applications providing application-to-application Web services or other API application endpoints. Various types of hacking operations discussed above may be used to attempt to misuse/attack various services and other resources that are provided by the computer server 110. The API security gateway 120 operates to intercept API requests generated by such hacking and other malicious operations, identify such API requests as being invalid, and prevent processing of invalid API request by the computer server 110.

As used herein, an "API request" can be any signaling occurring from a client computer to a computer server or other API endpoint that may be performed using a defined syntax and one or more parameters (e.g., data structure, object classes, and/or variables) to obtain data from an addressed resource and/or to provide data to the addressed resource. For example, SOAP and REST service requests can be performed using a defined API library of remote calls or other types of API requests. The API client computers 100a-100x or other types of source computers can be any type of computer that processes applications to generate API requests, such as Web service API calls, RESTful API requests, etc., and may include, but are not limited to desktop computers, laptop computers, tablet computers, smart phones, application servers, and mainframe computers. The computer server(s) 110 may correspondingly be any type of computer(s) having applications that expose services and/or resources through APIs and process API requests received through APIs, such as Web service API calls, RESTful API requests, etc., and may include, but are not limited to mainframe computers, application server equipment, desktop computers, laptop computers, tablet computers, and smart phones.

Figure 2:
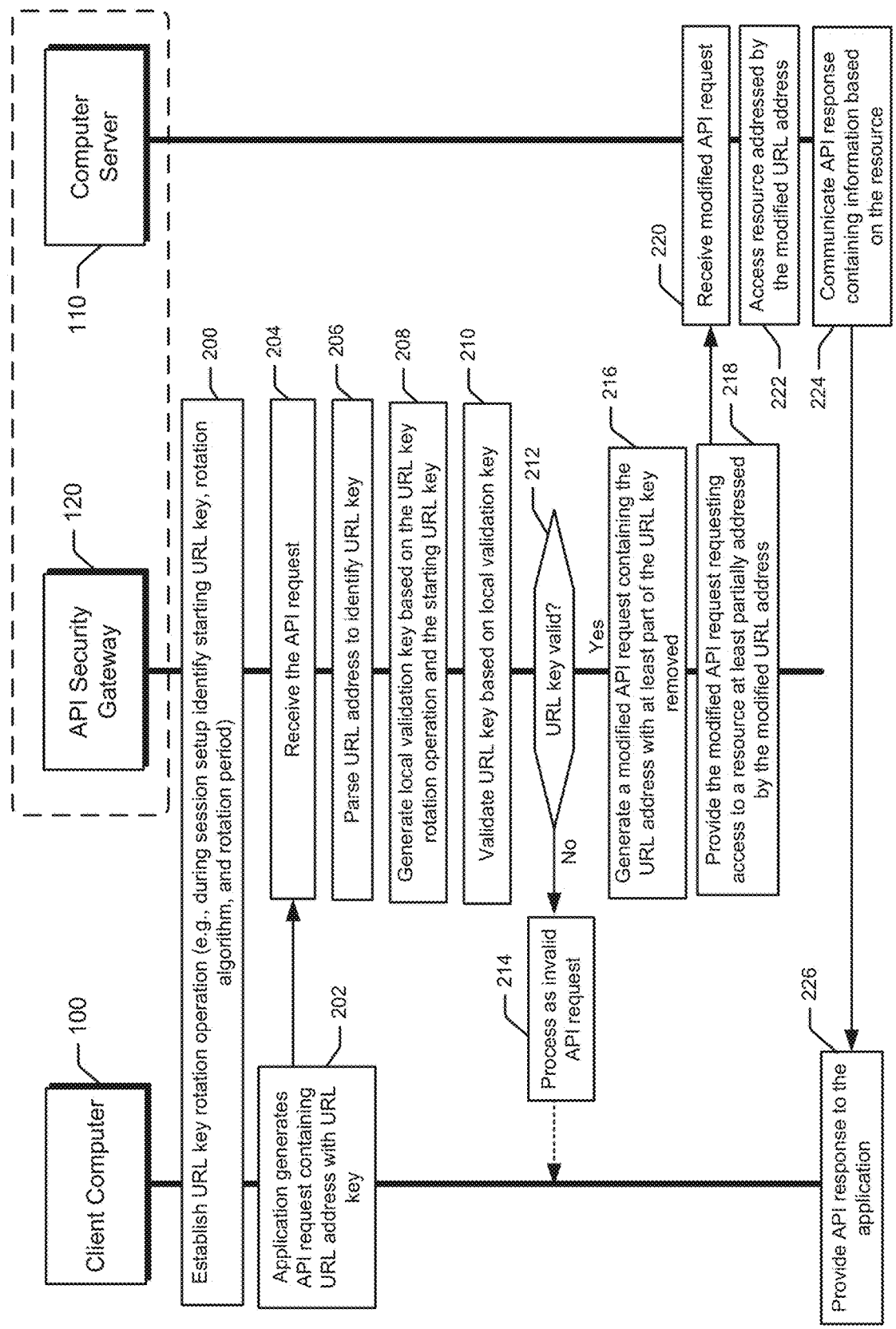
FIG. 2 is a combined data flow diagram and flowchart of operations that may be performed by the client computer, the API security gateway, and the computer server of FIG. 1 in accordance with some embodiments.

FIG. 2 is a combined data flow diagram and flowchart of operations that may be performed by the client computer 100, the API security gateway 120, and the computer server 110 of FIG. 1 in accordance with some embodiments.

Referring to FIG. 2, the client computer 100 and the API security gateway 120 communicate with each other through the data network 108 to establish (block 200) a URL key rotation operation. The communications may occur as part of a session initiation protocol (SIP) flow to establish a communication session between an application executed by the client computer 100 (called a "client application") and the API security gateway 120. Alternatively, the API security gateway 120 may be configured to monitor communications between the client application and the computer server 110 to observe messages exchanged during the SIP flow to establish a communication session between the client application and the computer server 110. Accordingly, the API security gateway 120 may intercept and The API security gateway 120 and the client application can establish a starting URL key, a rotation algorithm, and/or a rotation period, such as by various operations described below.

The client application generates (block 202) an API request containing a URL address for a resource that it desires to access through an API interface provided by the computer server 110. The URL address contains a URL key. The API security gateway 120 receives (block 204) the API request, and parses (block 206) the URL address to identify the URL key. The API security gateway 120 generates (block 208) a local validation key based on the URL key rotation operation, and validates (block 210) the URL key based on the local validation key to determine whether the URL key is valid.

The URL key rotation operation is configured to generate a local validation key that changes between each repetition of the URL key rotation operation based on one or more changing inputs to the operation that can include a time indicator, a message sequence number, and/or other information. The URL key rotation operation is not limited to eventually cycling back to repeat any previous key that has been generated, but instead in some embodiments can generate a random or pseudorandom sequence of local validation keys over numerous repetitions of the operation.

A decision (block 212) is made as to whether the URL key is valid. Based on determining that the URL key is valid, the API security gateway 120 generates (block 216) a modified API request containing the URL address with at least part of the URL key removed, and provides (block 218) the modified API request to the computer server 110 requesting access to a resource that is addressed at least partially by the modified URL address with the at least part of the URL key removed.

The computer server 110 receives (block 220) the modified API request, and processes the modified API request to access (block 222) a resource that is addressed by the modified URL address. The computer server 110 then communicates (block 224) an API response containing information that was obtained based on the accessed resource. The API response may be communicated directly to the client computer 100 via the data network 108 or may be relayed through the API security gateway 120 and the data network 108. The client computer 100 receives and provides (block 226) the API response to the client application.

Figure 3:
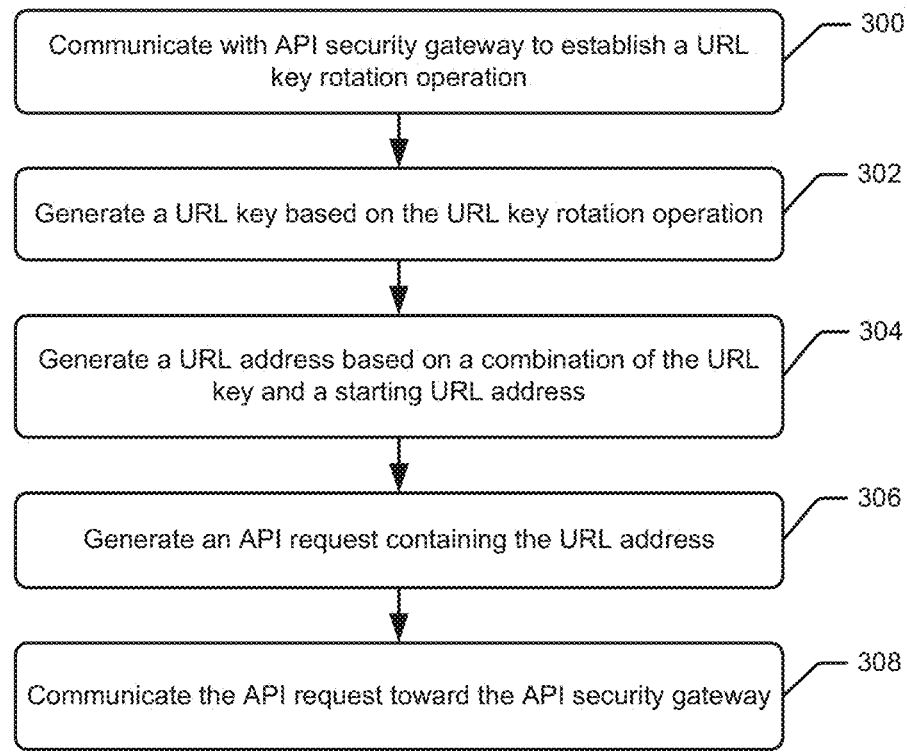
FIGS. 3 and 8 are flowcharts that illustrate operations that may be performed by an application executed by the client computer of FIGS. 1 and 2, in accordance with some embodiments.

Various related operations that may be performed by the client application executed by the client computer 100 are illustrated by the flowchart in FIG. 3. Referring to FIG. 3, the client application communicates (block 300 and block 200 of FIG. 2) with the API security gateway 120 to establish a URL key rotation operation. The client application generates (block 302) a URL key based on the URL key rotation operation, and generates (block 304) a URL address based on a combination of the URL key and a starting URL address. The client application then generates (block 306) an API request containing the URL address, and communicates (block 308) the API request toward the API security gateway 120.

In the following non-limiting example, the URL key can appear to an attacking (malicious) client application, such as one operated by hacker, to be a random number that is part of the URL address in an API request provided to an API interface of the computer server 110 or another API endpoint to access a resource. To the attacking client application, the URL key changes over time in an unpredictable manner to have the effect of "moving" the API address over time also in an unpredictable manner, making it difficult or impossible to mount repeated attacks on the API interface of the computer server 110.

For example, a URL key can be added to a "buyStock" URL address to transform it to be: "http://acme.com/apis/3a0cb278c3c605a179b5/buyStock", where the hexadecimal sequence "3a0cb278c3c605a179b5" is the URL key. The URL key is actually generated in a deterministic manner by a URL key rotation operation that has been established between a valid (authorized) client application and the API security gateway 120. A valid client application uses the URL key rotation operation to generate the URL key that it then includes in the URL request that it sends to the API security gateway 120, and the API security gateway 120 uses the URL key rotation operation to validate the URL key that it receives in the API request from the valid client application.

The URL key rotation operation can generate the URL key as a time-sensitive sequence from a starting URL key (e.g., initial seed value) and a rotation period value (e.g., a time period at which the URL key is repetitively changed) that has been established through communications between the client computer 100 and API security gateway 120. The URL key rotation operation may operate to change the URL key regularly at an interval, such as every 10 minutes, that is defined by the rotation period value. A valid client application can generate a currently valid URL key from a combination of the present global time and the starting URL key, wherein the starting URL key has been predefined in the application or is received from an authorized user. The URL key will be congruent (e.g., match) a current URL key that is generated by the API security gateway 120 using the key rotation operation. The client application can use the generated URL key to communicate with the computer server 110 via the API security gateway 120 using the standard HTTP protocol.

The API security gateway 120 validates the URL keys contained in incoming API requests against a local validation key that is generated by the API security gateway 120 using the URL key rotation operation. Any API request calls from client applications for URLs that contain invalid URL keys can be dropped, since they clearly originate from client applications without access to the correct key rotation operation, such as because they don't have access to starting URL key and/or don't have access to the rotation period value. There can be any number of active, valid sequences running in parallel, so that different client applications can be easily distinguished and separately validated by the API security gateway 120. If a client application is determined to have generated an invalid URL key (e.g., due to becoming compromised via a virus), its sequence can be invalidated and can be processed as invalid API requests.

In some embodiments, the URL key generated by the client application and the local validation key generated by the API security gateway 120 are generated using a cryptographic technique used in two-factor authentication products, such as RSA's SecurID. The generated key can be used as a one-time, two-factor authentication for the client application and the API security gateway 120. The cryptographic technique is used to modify URLs in API requests to mask the location of the URL addresses. In effect, these operations may operate to make a unique authentication event happen continuously on each and every API request transaction. This is independent of any other application layer authentication and session tracking.

To an attacker, the URL addresses contained in a sequence of API requests will in effect be moving around on continuous and entirely unpredictable basis. Without a valid URL key rotation operation and its parameters (e.g., starting URL key, key rotation timing, etc.), the attacker cannot generate a valid URL address to the API of the computer server 110 and cannot mount even a single attack, let alone probe a stateless API over time to discover its vulnerabilities. The API becomes invisible, and so cannot be probed. This can discourage attempts to compromise a known API, and will make automated discovery of unadvertised APIs impractical.

Various countermeasures could be applied when an unauthorized access attempt is detected by the API security gateway 120. These can range from an aggressive response (severing connection without reply, which may not advisable in some scenarios because it leaks information that an attack is detected), to responding with a standard HTTP 404 (not found) error code, which reveals nothing of value to an attacker and simply states that there is nothing at the requested computer server 110. Because unauthorized access attempts are now so unambiguously identifiable by the API security gateway 120, probing events can be better isolated and logged. This will minimize false positive alarms and make it more likely that operators will take additional action.

Figure 4:
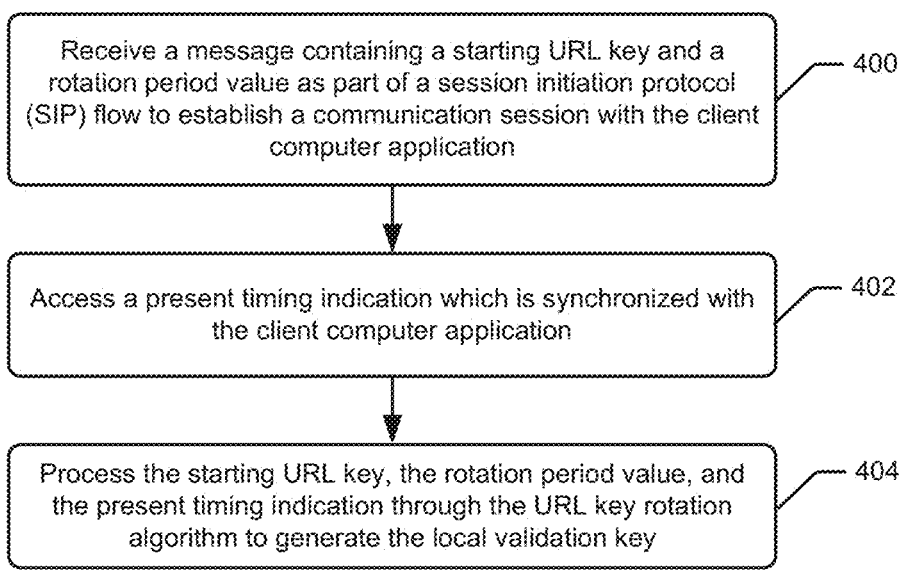
FIGS. 4-7 are flowcharts that illustrate operations that may be performed by the API security gateway of FIGS. 1 and 2, in accordance with some embodiments.

FIG. 4 is a flowchart that illustrate operations that may be performed by the API security gateway 120 to generate a local validation key that it then uses to validate the URL key received from the client application in an API request. The API security gateway 120 communicates with the client application to establish (block 200 of FIG. 2) the URL key rotation operation, which in the example of FIG. 4 includes receiving (block 400) from the client application a message containing a starting URL key and a rotation period value as part of a SIP flow to establish a communication session with the client application. The API request is received through the communication session. Generation (block 208 of FIG. 2) of the local validation key based on the URL key rotation operation, includes accessing (block 402) a present timing indication which is synchronized with the client application, such as a reference clock that is accessible to both the client computer 100 and the API security gateway 120 via the network 108, and processing (block 404) the starting URL key, the rotation period value, and the present timing indication through the URL key rotation algorithm to generate the local validation key.

With continued reference to FIG. 4, corresponding operations that can be performed by a client application to establish the URL key rotation operation with the API security gateway 120, can include sending a message containing a starting URL key and a rotation period value as part of a SIP flow to establish a communication session with the API security gateway 120. The client application can then generate the URL key based on the URL key rotation operation, by operations that include: accessing a present timing indication which is synchronized with the API security gateway; processing the starting URL key, the rotation period value, and the present timing indication through the URL key rotation algorithm to generate the URL key; and communicating the API request through the communication session to the API security gateway 120.

Although various embodiments have been described in the context of the URL key rotation operation being established through electronic communications (e.g., messaging communicated through one or more networks) directly between the client computer 100 and the API security gateway 120, some of the underlying communications may be relayed indirectly through an intermediary device such as a cellular phone operated by a person. For example, the client computer 100 and/or the API security gateway 120 may send an out-of-band message containing the starting URL key, an identifier value which identifies the rotation algorithm to be used, and/or a value identifying the rotation period to be used. The out-of-band message may be sent through, for example, a text message or email message to the intermediary device, e.g., cellular terminal, which is then read and manually inputted to the intended end-receiving device (e.g., the client computer 100 or the API security gateway 120) or who then electronically forwards the entire content or a selection portion of the content of the out-of-band message to the intended end-receiving device.

Operations by the API security gateway 120 to validate (block 210) the URL key based on the local validation key to determine whether the URL key is valid, can include: hashing the URL key to generate a hashed URL key value; hashing the local validation key to generate a hashed local validation key value; and then determining whether the URL key is valid responsive to whether the hashed URL key value matches the hashed local validation key value. The URL key may be determined to be valid only when the hashed URL key value matches (e.g., is numerically equal to) the hashed local validation key value.

Based on determining (block 212 of FIG. 2) that the URL key is not valid, the API security gateway 120 can operate to terminate the communication session with the client application. Termination of the communication session may include operating the API security gateway 120 to send a message to the computer server 110 that contains a command for the computer server 110 to terminate the communication session with the client application. Termination of the communication session with the client application can advantageously cut-off the ability of the client application to continue testing the computer server 110 through the communication session for vulnerabilities in its API interface. The communication session may have been set up as a trusted (e.g., encrypted) session which may have been granted privileges that become revoked for the client application by termination of the session.

Alternatively, the API security gateway 120 can respond to determining (block 212 of FIG. 2) that the URL key is not valid, by sending through the communication session to the client application an API response containing data indicating that the resource addressed by the URL address was not found and preventing the received API request and the modified API request from being provided to the computer server 110. By preventing the API requests from being provided to the computer server 110, the computer server 110 is thereby protected from the possible malicious testing of its API interface, and prevents burdensome processor loading that would otherwise result for the computer server 110 to attempt to process the API request. Responding to the client application in this manner may be beneficial by tricking the client application into believing that the computer server 110 receives and process the API request and attempt to access the addressed resource.

Figure 5:
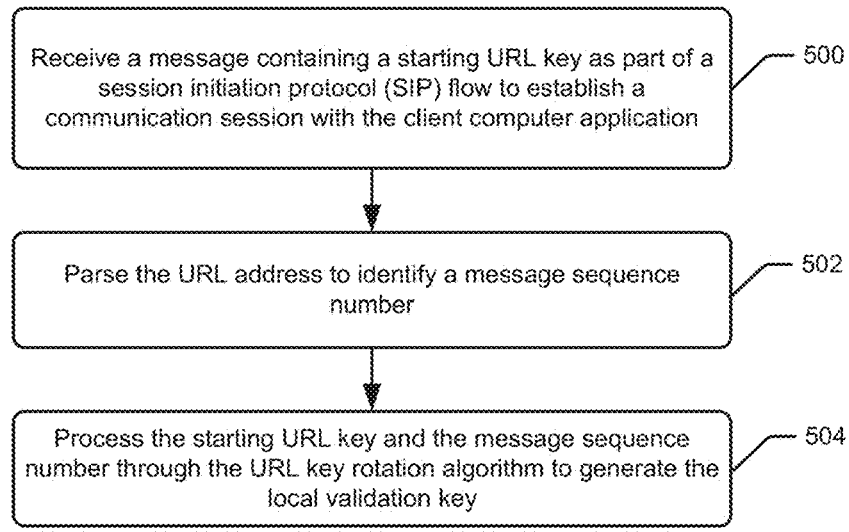

FIG. 5 is a flowchart that illustrate alternative operations that may be performed by the API security gateway 120 to generate a local validation key that it then uses to validate the URL key received from the client application in an API request. The API security gateway 120 communicates with the client application to establish (block 200 of FIG. 2) the URL key rotation operation, which in the example of FIG. 5 includes receiving (block 500) from the client application a message containing a starting URL key as part of a SIP flow to establish a communication session with the client application. The API request is received through the communication session and further contains a message sequence number. The API security gateway 120 may parse (block 502) the URL address to identify the message sequence number. Generation (block 208 of FIG. 2) of the local validation key based on the URL key rotation operation, includes processing (block 504) the starting URL key and the message sequence number through the URL key rotation algorithm to generate the local validation key.

With continued reference to FIG. 5, corresponding operations that can be performed by a client application to establish the URL key rotation operation with the API security gateway 120, can include sending a message containing a starting URL key as part of a SIP flow to establish a communication session with the API security gateway 120. The client application can then generate the URL key based on the URL key rotation operation, by operations that include processing the starting URL key and a message sequence number through the URL key rotation algorithm to generate the URL key. The message sequence number is generated to identify an API request, and may be generated to uniquely identify an API request from among a sequence of API requests, each having different message sequence numbers, that the client application sends to the API security gateway 120 within a same communication session. The client application embeds the message sequence number in the API request, and communicates API request through the communication session to the API security gateway 120.

Figure 6:
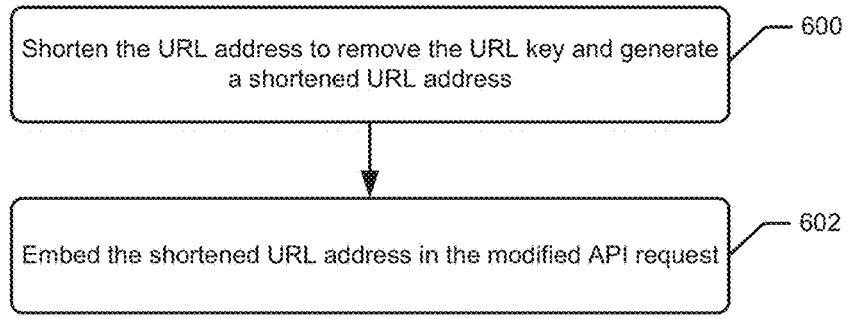

FIG. 6 is a flowchart of operations that may be performed by the API security gateway 120 to generate (block 216 of FIG. 2) in accordance with some embodiments. Referring to FIG. 6, the API security gateway 120 shortens (block 600) the URL address to remove the URL key and generate a shortened URL address, and embeds (block 602) the shortened URL address in the modified API request. In one embodiment, the URL address that the API security gateway 120 receives (block 204 of FIG. 2) in the API request is not a resource address that identifies to the computer server 110 a particular resource being requested by the client computer application, and the shortened URL address is a resource address that identifies to the computer server 110 the particular resource being requested by the client computer application.

Further to the above example, the API security gateway 120 can shorten the URL address "http://acme.com/apis/3a0cb278c3c605a179b5/buyStock", which is received in the API request from the client application, to remove the hexadecimal sequence "3a0cb278c3c605a179b5". The shorted URL address of "http://acme.com/apis/buyStock" is provided in the modified API request to the computer server 110. In this example, the URL address that is received in an API request would not be recognized by the computer server 110 as a proper address for a resource that is accessible through the computer server 110. In sharp contrast, the shortened URL address is recognized by the computer server 110 as a proper resource address.

Figure 7:
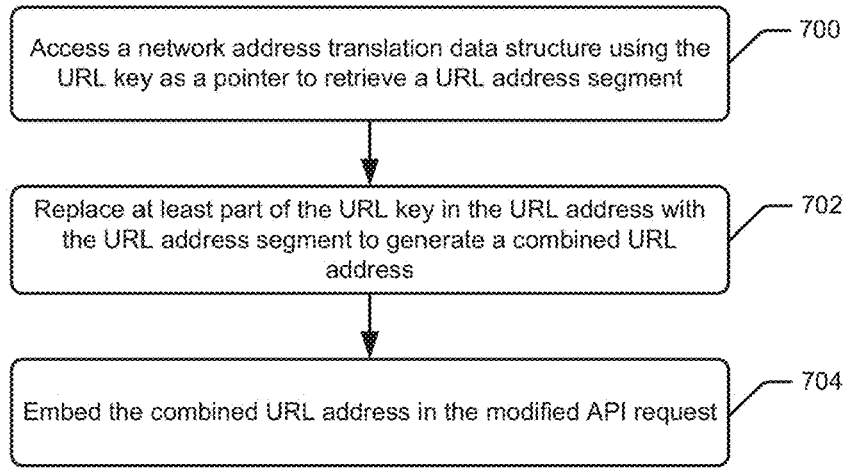

FIG. 7 is a flowchart of some other operations that may be performed by the API security gateway 120 to generate (block 216 of FIG. 2) in accordance with some other embodiments. Referring to FIG. 7, the API security gateway 120 accesses (block 700) a resource address translation data structure using the URL key as a pointer to retrieve a URL address segment. Resource address translation data structure provides a one-to-one mapping between individual URL keys among a set of defined URL keys to individual URL address segment among a set of URL address segments. The gateway 120 replaces (block 702) at least part of the URL key in the URL address with the URL address segment to generate a combined URL address, and then embeds (block 704) the combined URL address in the modified API request. In one embodiment, the URL address having the at least part of URL key removed is not a resource address that identifies to the computer server 110 a particular resource being requested by the client application, and the combined URL address having the at least part of the URL key replaced in the URL address with the URL address segment is a resource address that identifies to the computer server 110 a particular resource being requested by the client application.

By the operations of FIG. 7, the API security gateway 120 using the resource address translation data structure effectively hides from the client application the proper resource addresses that must be provided to the computer server 110 to properly address its resources. The client application is thereby only able to access a resource on the computer server 110 if it includes a valid URL in a URL request, otherwise the URL request does not contain a complete resource address that can be used by the computer server 110 to access a resource. Moreover, the client application must have its API request processed through the API security gateway 120 in order to have the URL address contained therein transformed into a modified URL address that is provided through the modified API request to the computer server 110.

Figure 8:
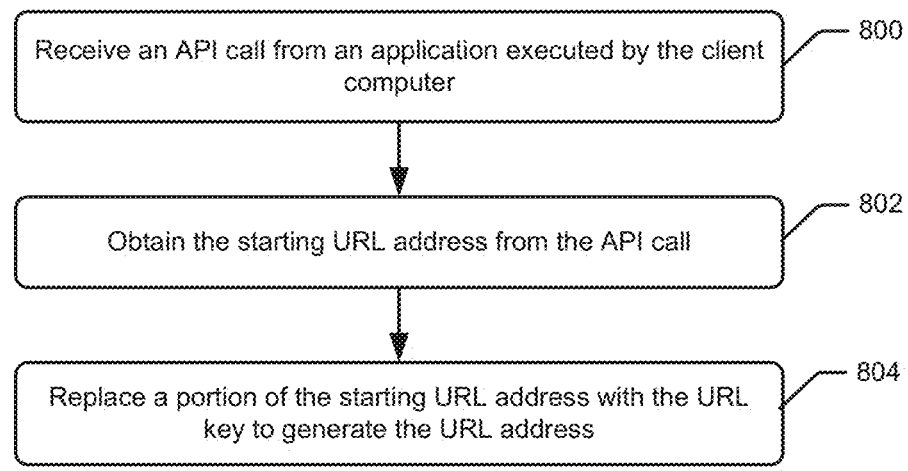

In some related operations, the client application can operate to obscure the URL address in an API request from other applications that are operating on the client computer 100 and/or on other client computers that be able to observe communications between the client application an API security gateway 120. FIG. 8 is a flowchart of operations of may be performed by a client application being executed by the client computer 100 to obscure the URL address in an API request. Referring to FIG. 8, generation (block 202 of FIG. 2) of the URL address by the client application can include receiving (block 800) an API call from another application executed by the client computer 100. The client application obtains (block 802) the starting URL address from the API call. The starting URL address provides a full address identifying to the computer server 110 a particular resource being requested by the other application. The client application then combines the URL key and the starting URL address to generate the URL address, where the combining may include replacing (block 804) a portion of the starting URL address with the URL key to generate the URL address which no longer provides the full address identifying to the computer server the particular resource being requested by the application.

The various operations and methods disclosed herein can reduce security risks to computer servers when processing API requests that are received through APIs that the computer servers provide to applications. API security gateways can effectively shield the computer servers from at least some attempts to hack or otherwise obtain improper access to resources of the computer servers.

Figure 9:
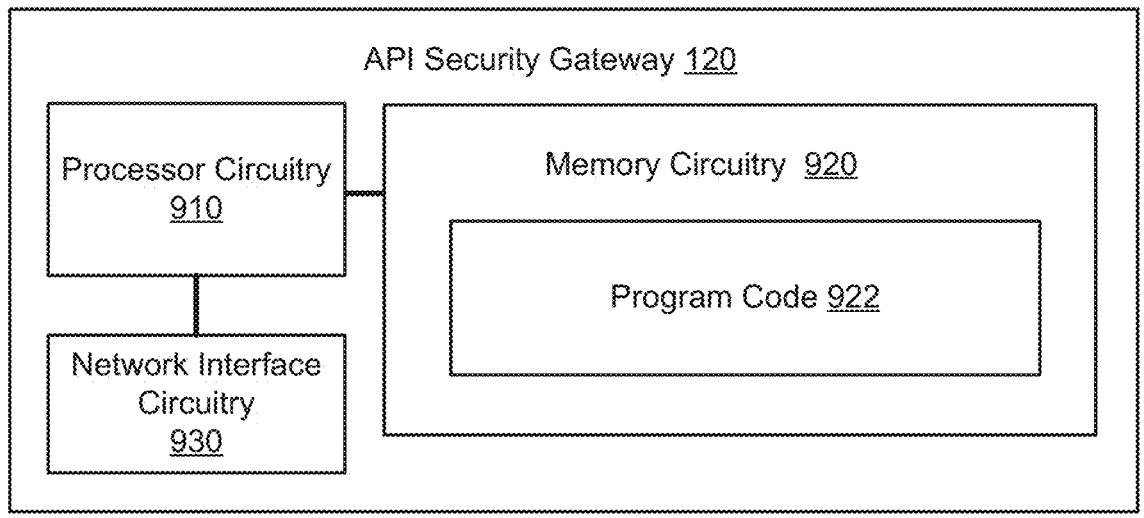
FIG. 9 is a block diagram of an API security gateway that can be configured to perform operations of the API security gateway of FIGS. 1, 2, and 4-7, in accordance with some embodiments.

FIG. 9 is a block diagram of an API security gateway 120 that can be configured to perform operations in accordance with some embodiments. Referring to FIG. 9, the API security gateway 120 can include a network interface circuitry 930 which communicates via the one or more data networks 108 with the client computers 100a-100x, the computer server(s) 110, and other components of the system. The API security gateway 120 includes processor circuitry 910 and memory circuitry 920 that contains computer program code 922 which performs various operations disclosed herein when executed by the processor circuitry 910. The processor circuitry 910 may include one or more data processing circuits, such as a general purpose and/or special purpose processor (e.g., microprocessor and/or digital signal processor), which may be collocated or distributed across one or more data networks (e.g., network(s) 108). The processor circuitry 910 is configured to execute computer program instructions among the program code 922 in the memory circuitry 920, described below as a computer readable medium, to perform some or all of the operations and methods for one or more of the embodiments disclosed herein.

FURTHER DEFINITIONS AND EMBODIMENTS

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by an application programming interface (API) security gateway comprising:
   communicating, via a network interface, with a client computer application to establish a URL key rotation operation;
   receiving, via the network interface, an API request from the client computer application that is directed to a computer server, the API request containing a URL address;
   parsing the URL address to identify a URL key;
   generating a local validation key based on the URL key rotation operation;
   validating the URL key based on the local validation key to determine whether the URL key is valid; and
   based on determining that the URL key is valid,
   generating a modified API request containing the URL address with at least part of the URL key removed, and
   providing the modified API request, via the network interface, to the computer server.

2. The method of claim 1,
   wherein communicating with the client computer application to establish the URL key rotation operation, comprises receiving a message containing a starting URL key and a rotation period value as part of a session initiation protocol (SIP) flow to establish a communication session with the client computer application;
   wherein the API request is received through the communication session;
   wherein generating the local validation key based on the URL key rotation operation, comprises:
   accessing a present timing indication which is synchronized with the client computer application; and
   processing the starting URL key, the rotation period value, and the present timing indication through a URL key rotation algorithm to generate the local validation key.

3. The method of claim 2, further comprising:
   based on determining that the URL key is not valid, terminating the communication session with the client computer application.

4. The method of claim 2, further comprising:
   based on determining that the URL key is not valid, sending through the communication session to the client computer application an API response containing data indicating that a resource addressed by the URL address was not found and preventing the modified API request from being provided to the computer server.

5. The method of claim 1,
   wherein communicating with the client computer application to establish the URL key rotation operation, comprises receiving a message containing a starting URL key as part of a session initiation protocol (SIP) flow to establish a communication session with the client computer application;
   wherein the API request received from the client computer application further contains a message sequence number; and
   wherein generating the local validation key based on the URL key rotation operation, comprises processing the starting URL key and the message sequence number through a URL key rotation algorithm to generate the local validation key.

6. The method of claim 5, further comprising:
   parsing the URL address to identify the message sequence number.

7. The method of claim 1, wherein validating the URL key based on the local validation key to determine whether the URL key is valid, comprises:
   hashing the URL key to generate a hashed URL key value;
   hashing the local validation key to generate a hashed local validation key value; and
   determining that the URL key is valid responsive to the hashed URL key value matching the hashed local validation key value.

8. The method of claim 1, wherein generating the modified API request containing the URL address with at least part of the URL key removed, comprises:
   shortening the URL address to remove the URL key and generate a shortened URL address; and
   embedding the shortened URL address in the modified API request.

9. The method of claim 8, wherein the URL address received in the API request is not a resource address that identifies to the computer server a particular resource being requested by the client computer application, and the shortened URL address is a resource address that identifies to the computer server the particular resource being requested by the client computer application.

10. The method of claim 1, wherein generating the modified API request containing the URL address with at least part of the URL key removed, comprises:
    accessing a network address translation data structure using the URL key as a pointer to retrieve a URL address segment;
    replacing at least part of the URL key in the URL address with the URL address segment to generate a combined URL address; and
    embedding the combined URL address in the modified API request.

11. The method of claim 10, wherein the URL address having the at least part of the URL key removed is not a resource address that identifies to the computer server a particular resource being requested by the client computer application, and the combined URL address having the at least part of the URL key replaced in the URL address with the URL address segment is a resource address that identifies to the computer server a particular resource being requested by the client computer application.

12. The method of claim 1, wherein providing the modified API request to the computer server, comprises:
    communicating the modified API request through network interface circuitry toward the computer server to access a resource which is addressed at least partially by the URL address with the at least part of the URL key removed.

13. The method of claim 1, further comprising:
    operating processor circuitry of the API security gateway to perform the parsing of the URL address, the generating of the local validation key, the validating of the URL key, and the generating the modified API request; and
    operating the processor circuitry in combination with network interface circuitry to perform the communicating with the client computer application, the receiving of the API request, and the providing of the modified API request.

14. An application programming interface (API) security gateway comprising:
  network interface circuitry;
  processor circuitry coupled to the network interface circuitry; and
  memory circuitry coupled to the processor circuitry and comprising computer readable program code that when executed by the processor circuitry causes the processor circuitry to perform operations comprising:
    communicating through the network interface circuitry with a client computer application to establish a URL key rotation operation;
    receiving through the network interface circuitry an API request from the client computer application that is directed to a computer server, the API request containing a URL address;
    parsing the URL address to identify a URL key;
    generating a local validation key based on the URL key rotation operation;
    validating the URL key based on the local validation key to determine whether the URL key is valid; and
    based on determining that the URL key is valid,
      generating a modified API request containing the URL address with at least part of the URL key removed, and
      providing the modified API request through the network interface circuitry to the computer server.

15. The API security gateway of claim 14, wherein the operations further comprise:
  wherein communicating with the client computer application to establish the URL key rotation operation, comprises receiving a message containing a starting URL key and a rotation period value as part of a session initiation protocol (SIP) flow to establish a communication session with the client computer application;
  wherein the API request is received through the communication session;
  wherein generating the local validation key based on the URL key rotation operation, comprises:
    accessing a present timing indication which is synchronized with the client computer application; and
    processing the starting URL key, the rotation period value, and the present timing indication through a URL key rotation algorithm to generate the local validation key; and
  wherein generating the modified API request containing the URL address with at least part of the URL key removed, comprises:
    shortening the URL address to remove the URL key and generate a shortened URL address; and
    embedding the shortened URL address in the modified API request,
      the URL address received in the API request is not a resource address that identifies to the computer server a particular resource being requested by the client computer application, and the shortened URL address is a resource address that identifies to the computer server the particular resource being requested by the client computer application.

16. A non-transitory, computer-readable medium having instructions stored thereon that are executable by an application programming interface (API) security gateway to perform operations comprising:
  communicating, via a network interface, with a client computer application to establish a URL key rotation operation;
  receiving, via the network interface, an API request from the client computer application that is directed to a computer server, the API request containing a URL address;
  parsing the URL address to identify a URL key;
  generating a local validation key based on the URL key rotation operation;
  validating the URL key based on the local validation key to determine whether the URL key is valid; and
  based on determining that the URL key is valid,
    generating a modified API request containing the URL address with at least part of the URL key removed, and
    providing the modified API request, via the network interface, to the computer server.

17. The non-transitory, computer-readable medium of claim 16,
  wherein communicating with the client computer application to establish the URL key rotation operation comprises receiving a message containing a starting URL key and a rotation period value as part of a session initiation protocol (SIP) flow to establish a communication session with the client computer application;
  wherein the API request is received through the communication session;
  wherein generating the local validation key based on the URL key rotation operation, comprises:
    accessing a present timing indication which is synchronized with the client computer application; and
    processing the starting URL key, the rotation period value, and the present timing indication through a URL key rotation algorithm to generate the local validation key.

18. The non-transitory, computer-readable medium of claim 17, wherein the operations further comprise:
  based on determining that the URL key is not valid, terminating the communication session with the client computer application.

19. The non-transitory, computer-readable medium of claim 17, wherein the operations further comprise:
  based on determining that the URL key is not valid, sending through the communication session to the client computer application an API response containing data indicating that a resource addressed by the URL address was not found and preventing the modified API request from being provided to the computer server.

20. The non-transitory, computer-readable medium of claim 16,
  wherein communicating with the client computer application to establish the URL key rotation operation, comprises receiving a message containing a starting URL key as part of a session initiation protocol (SIP) flow to establish a communication session with the client computer application;
  wherein the API request received from the client computer application further contains a message sequence number; and
  wherein generating the local validation key based on the URL key rotation operation, comprises processing the starting URL key and the message sequence number through a URL key rotation algorithm to generate the local validation key.

* * * * *